(12) United States Patent
Riedhammer

(10) Patent No.: US 7,146,901 B2
(45) Date of Patent: Dec. 12, 2006

(54) HYDRAULIC SYSTEM

(75) Inventor: Michael Riedhammer, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/550,969

(22) PCT Filed: Mar. 20, 2004

(86) PCT No.: PCT/EP2004/002947

§ 371 (c)(1),
(2), (4) Date: Sep. 26, 2005

(87) PCT Pub. No.: WO2005/093295

PCT Pub. Date: Oct. 6, 2005

(65) Prior Publication Data

US 2006/0191404 A1    Aug. 31, 2006

(30) Foreign Application Priority Data

Mar. 26, 2003 (DE) ................................ 103 13 487

(51) Int. Cl.
  *F15B 13/04* (2006.01)
  *F01B 35/02* (2006.01)
(52) U.S. Cl. .......................................... 91/431; 91/47

(58) Field of Classification Search ....................... 91/6, 91/31, 47, 431
See application file for complete search history.

(56) References Cited

U.S. PATENT DOCUMENTS

| 6,079,206 | A | 6/2000 | Petrzik et al. |
| 6,505,529 | B1 | 1/2003 | Legner et al. |
| 6,658,842 | B1 * | 12/2003 | Yamasaki et al. ............. 91/431 |

FOREIGN PATENT DOCUMENTS

| DE | 29 43 526 A1 | 5/1981 |
| DE | 44 39 454 A1 | 5/1996 |
| DE | 198 46 955 A1 | 4/2000 |
| EP | 1 296 065 A1 | 3/2003 |
| JP | 63-92804 | 4/1988 |

* cited by examiner

*Primary Examiner*—Michael Leslie
(74) *Attorney, Agent, or Firm*—Davis & Bujold, P.L.L.C.

(57) ABSTRACT

A piston space (7) of the consumer (10) has two delivery lines (6, 8), such that when the consumer (10, 12, 13, 14) is not actuated, pressure medium flows continuously via the second delivery line (6) through the piston space (7) and into a pressure medium reservoir (2) to maintain a consumer (10, 12, 13, 14) in readiness for actuation and operate it with uniform pressure medium viscosity. Pressure medium is passed into the piston space (7) through both the first pressure medium delivery line (8) and the second pressure medium delivery line (6) to actuate the consumer (10, 12, 13, 14).

4 Claims, 1 Drawing Sheet

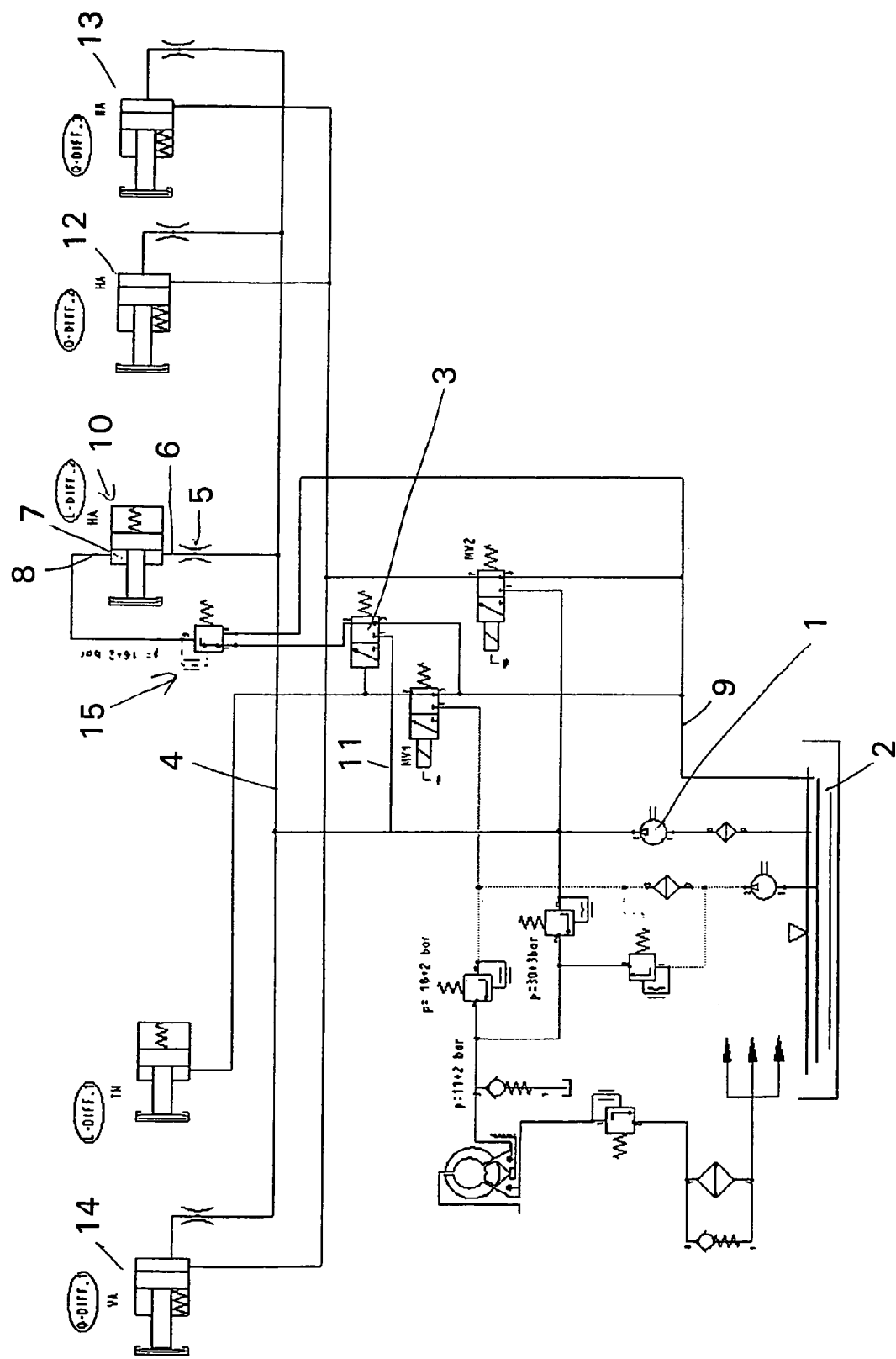

HYDRAULIC SYSTEM

This application is a national stage completion of PCT/EP2004/002947 filed Mar. 20, 2004 which claims priority from German Application Serial No. 103 13 487.5 filed Mar. 26, 2003.

FIELD OF THE INVENTION

The invention concerns a hydraulic system.

BACKGROUND OF THE INVENTION

Hydraulic systems of this type actuate a consumer when pressure medium from a pressure medium source is delivered into a piston space of a consumer in order to displace a piston. The consumer can be, for example, a blockable differential transmission in which the piston of the actuation device acts upon a disk brake. In such a case, a decisive factor for driving comfort is the response behavior of the differential block, which is determined by the speed of the piston. Particularly when the outside temperature is low, the viscosity of the pressure liquid increases and this considerably reduces the response of the piston and so too the actuation speed of the differential block leading to undesired driving situations.

DE 198 46 955 A1 discloses a reversing transmission that can be shifted under load in which, to vent the piston space, when the actuator is not in its active condition, pressure medium passes through the piston space via a throttle point and a one-way valve and flows into the pressure reservoir. If the piston space is pressurized, the one-way valve closes and pressure medium passes into the piston space through a delivery line.

The purpose of the present invention is to provide a hydraulic system in which the actuation device can be operated rapidly and reliably even at low temperatures.

SUMMARY OF THE INVENTION

In the hydraulic system, pressure medium is drawn from a pressure medium reservoir by a pressure medium source, according to the invention; passes into the piston space, via a throttle point, in the non-actuated condition, and is then passed back into the pressure medium reservoir. This ensures that a stream of pressure medium is constantly flowing through the consumer and, therefore, that all the delivery lines are filled with pressure medium so that a uniform operating viscosity is maintained. When the piston space is pressurized and the consumer is actuated, the pressurization takes place via at least two pressure medium delivery lines and this ensures that the pressurization and the piston movement can take place very rapidly. Preferably, this is achieved, via a first pressure medium delivery line, connected by a 3/2-way valve to the pressure medium source and, via a second delivery line, which is permanently connected to the pressure medium source. If the hydraulic system comprises several consumers that have to be actuated at different pressure levels, a pressure-limiting valve can be fitted between the 3/2-way valve and the consumer to ensure that a defined pressure level is not exceeded at the consumer. This pressure-limiting valve can be continuously adjustable, for example, to set a defined slip condition of the blocking clutch at a differential.

The hydraulic system, according to the invention, ensures that the piston of the consumer can be actuated with the same rapidity regardless of the external temperature. An additional advantage of the system is that it is of simple construction and comprises only a small number of components and valves.

BRIEF DESCRIPTION OF THE DRAWINGS

The invention will now be described, by way of example, with reference to the accompanying drawings in which:

The single FIGURE is a diagrammatic representation of a hydraulic system.

DETAILED DESCRIPTION OF THE INVENTION

The single FIGURE represents a hydraulic system in which a pressure medium source 1 draws pressure medium from a pressure medium reservoir 2 and delivers it, on the one hand, to a 3/2-way valve 3 and, on the other hand, to a delivery line 4. When the 3/2-way valve 3 is in its starting condition, pressure medium passes through the line 4 to a throttle point 5 and from there into a second pressure medium deliver line 6 and through this into a piston space 7, from which the pressure medium can flow back via a first pressure medium delivery line 8 to the 3/2-way valve 3 and, from there, via a line 9 into the pressure medium reservoir 2. This ensures that when a consumer 10 is not actuated, pressure medium flows constantly from the pressure medium source 1 through the piston space 7 and from there back into the pressure medium reservoir 2. When the 3/2-way valve 3 is actuated, pressure medium passes via a delivery line 11 to the first pressure medium delivery line 8 and from there into the piston space 7 and, at the same time, pressure medium also flows via the throttle point 5 and the second pressure medium delivery line 6 into the piston space 7, whereby the consumer 10 is actuated rapidly and reliably. Consumers 12, 13 and 14 are controlled in an analogous manner. To be able to pressurize the consumers at different pressure levels, a pressure-limiting valve 15 is arranged between the 3/2-way valve 3 and the first pressure medium delivery line 8. Depending on its setting, the pressure in the piston space 7 can be controlled. The consumers 12, 13 and 14 can also be provided with corresponding pressure-limiting valves.

REFERENCE NUMERALS

1 Pressure medium source
2 Pressure medium reservoir
3 3/2-way valve
4 Delivery line
5 Throttle point
6 Second pressure medium delivery line
7 Piston space
8 First pressure medium delivery line
9 Delivery line
10 Consumer
11 Delivery line
12 Consumer
13 Consumer
14 Consumer
15 Pressure-limiting valve

The invention claimed is:
1. A hydraulic system, in which pressure medium from a pressure medium reservoir (2) is delivered by a pressure medium source (1) to at least one consumer (10, 12, 13, 14) with a piston space (7) and at least two pressure medium delivery lines (6, 8), such that when the at least one consumer (10, 12, 13, 14) is in a non-actuated condition a first pressure medium delivery line (8) is connected to the pressure medium reservoir (2) and a second pressure medium delivery line (6) is connected to the pressure medium source (1), when the at least one consumer (10, 12, 13, 14) is in an actuated condition, the first and second pressure medium delivery lines (6, 8) are both connected to the pressure medium source (1) and the pressure level in the first and second pressure medium delivery lines (6, 8) is the same.

2. The hydraulic system according to claim 1, wherein the first pressure medium delivery line (8) can be connected by a 3/2-way valve (3) to one of the pressure medium source (1) or the pressure medium reservoir (2).

3. The hydraulic system according to claim 1, wherein the second pressure medium delivery line (6) is connected via a throttle point (5) to the pressure medium source (1).

4. The hydraulic system according to claim 2, wherein a pressure-limiting valve (15) is arranged between the 3/2-way valve (3) and the at least one consumer (10, 12, 13, 14).

* * * * *